Sept. 28, 1948. F. M. GUY 2,450,279
RESILIENT SHAFT HANGER
Filed March 12, 1943
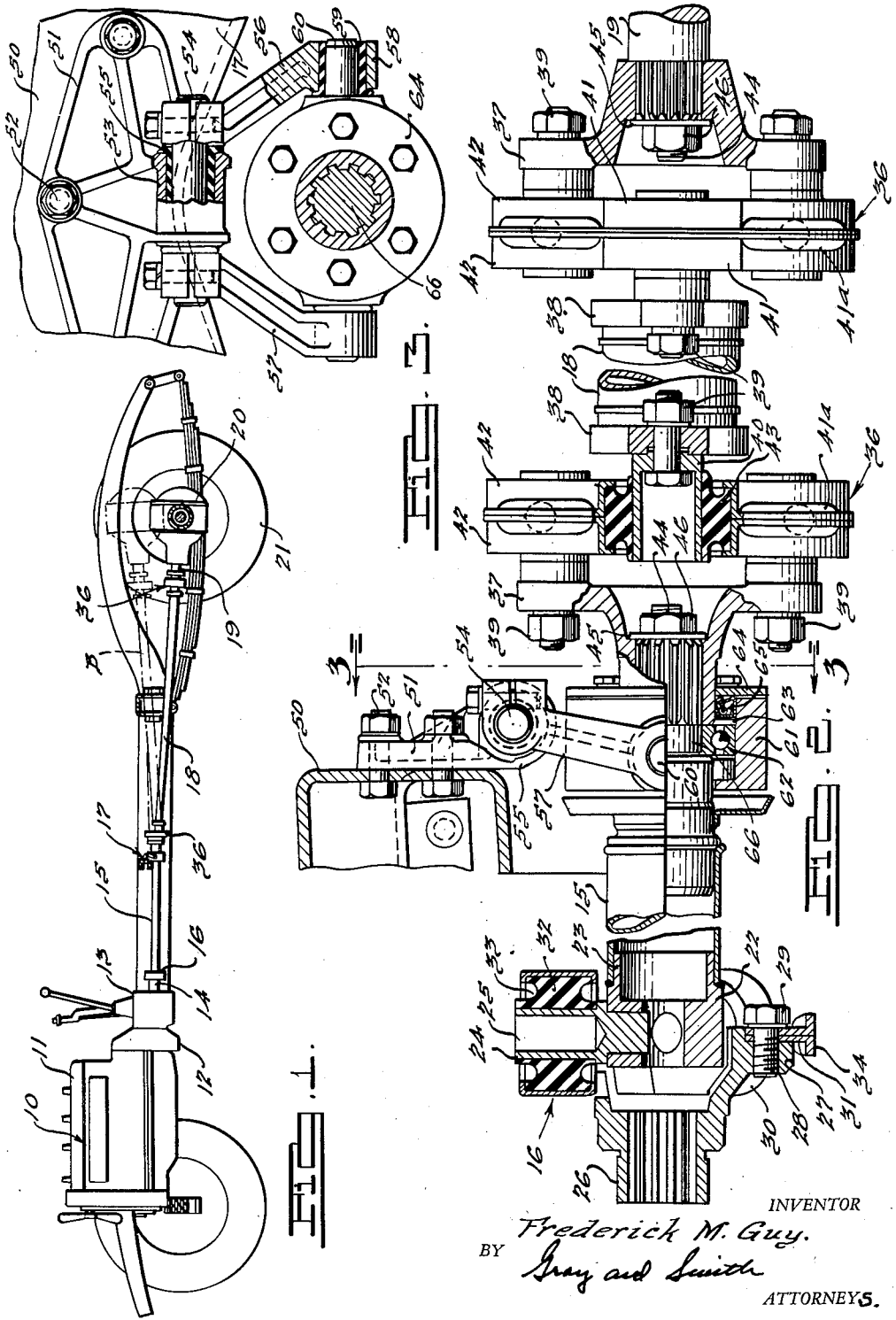
INVENTOR
Frederick M. Guy.
BY Gray and Smith
ATTORNEYS.

Patented Sept. 28, 1948

2,450,279

UNITED STATES PATENT OFFICE 2,450,279

RESILIENT SHAFT HANGER

Frederick M. Guy, Detroit, Mich., assignor, by mesne assignments, to U. S. Universal Joints Company, a corporation of Michigan Application March 12, 1943, Serial No. 478,899

4 Claims. (Cl. 308—28)

The present invention relates to a resilient shaft hanger, which in one of its embodiments is particularly, but not exclusively adapted for use in motor vehicle constructions to provide a flexible support for a driven shaft or the like which may be subjected to forces causing its longitudinal, axial, or parallel movement relative to a supporting member.

In one of its embodiments the present invention is particularly adapted for use in securing an intermediate driven shaft to a portion of the cross frame of a motor vehicle in such a manner as to permit relative movement of the said intermediate driven shaft relative to the vehicle chassis.

Such a construction is particularly desirable also for use in connection with a floatingly mounted propeller shaft resiliently connected with a transmission shaft.

However, the invention is not limited to such uses as it may be used wherever it is desired to use a flexibly mounted pipe or shaft hanger construction in which it the pipe or shaft is to be acoustically insulated from the suspending member to prevent the transmission of noise vibration, heat or the like from the shaft to the supporting member or vice versa.

It is among the objects of the present invention, therefore, to provide a resiliently mounted shaft hanger or support which allows universal movement within predetermined limits of the supported shaft relative to a fixed point of attachment of the hanger to a supporting member, thereby permitting longitudinal, axial and parallel movement of the supported shaft relative to the supporting member.

Another object of the invention is to provide a resiliently mounted shaft hanger in which the shaft supported thereby may move bodily within restricted limits relative to the supporting surface without imposing upon the shaft the strains normally imposed thereon by reason of forces tending to cause misalignment of the shaft when rigidly held in a predetermined position.

It is a further object of the present invention to provide a resiliently mounted hanger particularly adapted for use in supporting a flexibly mounted rigid rotating shaft and to permit its bodily movement relative to the supporting surface by means of a resilient hanger member in which a resiliently cushioned movement of the parts relative to each other is permitted while the parts are acoustically insulated.

It is a further object of the present invention to provide a resiliently mounted hanger in which all vibrations transmitted from the shaft to the supporting member or vice versa are absorbed in a resilient sound deadening supporting medium.

Another object of the present invention is to provide a flexibly mounted hanger which has relatively few and simple parts, each of which may be constructed separately and which if desired may be manufactured, shipped, and handled in a disassembled state and which may be readily, quickly and conveniently assembled and installed when its use is desired. In addition, a structure embodying the present invention is relatively inexpensive to manufacture, install, service and repair.

Other objects of this invention will appear in the following description and appended claims, reference being had to the accompanying drawings forming a part of this specification wherein like reference characters designate corresponding parts in the several views.

Fig. 1 is a sectional side view of the chassis of a motor vehicle in which a resiliently mounted hanger of the present invention is installed.

Fig. 2 is a fragmentary side view partially in section of the sub-shaft and the propeller shaft assembly.

Fig. 3 is a fragmentary sectional view taken substantially on the line 3—3 looking in the direction of the arrows of Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the accompanying drawings the resilient shaft hanger of the present invention is shown applied to a motor vehicle having embodied therein a system of drive shafts and universal joints such as is shown in my prior Patent No. 2,195,647, issued April 2, 1940, to which reference is hereby made for any details of construction and operation of such a driving shaft assembly and which may not be fully set forth herein.

A motor vehicle constructed in accordance with the disclosures of said Patent No. 2,195,647, as shown in Fig. 1, comprises a power plant assembly 10, including an engine 11, a clutch 12, and a transmission 13, operatively connected to said engine and secured to the housing thereof. The end of the transmission shaft 14 extends toward the rear of the vehicle and is operatively connected with a horizontally extending sub-shaft 15 by means of a universal joint or flexible coupling indicated generally by the numeral 16. At the rear of the sub-shaft 15 there is provided a resilient hanger embodying the present invention and which in this view is identified generally by the numeral 17. This resiliently mounted hanger, as will be hereinafter described in more detail, supports the rear end of the shaft 15 adjacent the cross frame member 50 of the vehicle. As shown, a tubular propeller shaft 18 is operatively connected to the sub-shaft 15 and to a final drive shaft 19 of a conventional rear axle 20 carrying and driving the driving wheels 21. The rear axle 20 is operatively suspended on the vehicle frame by means of a known construction referred to in the art as the Hotchkiss drive. This construction is well known in the art and is illustrated in Fig. 1 with clarity sufficient for the purposes of the present invention.

The coupling 16 comprises a cylindrical member 22 having an end 23, fitted into the end of the tubular sub-shaft 15, and welded or otherwise secured thereto. The cylindrical surface of the member 22 is milled off in a plurality of places for the convenience of securing a plurality of radially extending studs 24 thereto, three of said studs being employed in the preferred embodiment of the coupling construction as here shown. The studs 24 are preferably drilled out as indicated at 25, in order to decrease their weight.

The splined member 26 is adapted to engage the end of the transmission shaft 14 and has a plurality of lugs or prongs 27 provided with tapped holes 28. Two similar annular members, made preferably of sheet steel by stamping operations, are secured to the member 26 by means of screws 29 engaging said member at the holes 28 as shown in Fig. 2.

Semi-cylindrical portions 30, three of which are provided on each of the members 31, form when the members are flatly arranged against each other, cylindrical nests extending radially and encircling the studs 24. In the space between the outside cylindrical surfaces of the studs and the inside cylindrical surfaces of the nests there are arranged rubber bushings 32 mounted on the studs 24, and clamped at their peripheral surfaces by the semi-cylindrical portions 30. At the surfaces of contact of rubber and metal, the rubber may be bonded to the metal. The rubber bushings 32 are relieved at their faces as indicated at 33 in order to effect a substantially uniform deflection of the rubber throughout the mass of the bushings when torque is transmitted thereby. The cylindrical surface of contact between the studs and the rubber bushings is made longer than the surfaces of contact of the rubber bushings at the nests formed in the members 31, in order to produce the same area of contact between the metal and rubber at both surfaces in spite of the smaller diameter of the bonded surface at the studs. The members 31 are preferably made more rigid by the provision of flanges 34.

Thus a resilient driving connection is effected between the transmission shaft 14 and the sub-shaft 15, the radial arrangement of the rubber bushings making them particularly effective to resist resiliently the end thrust which may be transmitted to the sub-shaft 15 during operation of the driving system.

The tubular propeller shaft 18 is operatively connected with the sub-shaft 15 and the final drive shaft 19 by means of two similar couplings each indicated generally by the numeral 36. Each of said couplings comprises a splined fork member 37, adapted to engage the splined end of the sub-shaft and the final drive shaft respectively, and a similar fork member 38, having an end fitted into the tubular end of the propeller shaft and welded or otherwise secured thereto. To the fingers or prongs of the fork members are secured by means of bolts 39, four hollow studs 40, extending substantially parallel to the axis of the shaft, one stud being provided on each prong. Two similar angular members 41 arranged one against the other and riveted or otherwise secured together are disposed between the members 37 and 38. Cylindrical portions 42 are formed on said members 41 for providing passages for the studs and nests for the rubber bushings 43 mounted on the studs 40 and suitably secured therein. The studs and bushings are equidistantly arranged, construction of the rubber bushings 43 being substantially similar to that of the bushings 32 of the coupling 16. Beads 41—A may be provided to increase the rigidity of the members 41.

By virtue of the above construction resilient driving connections are effected between the propeller shaft, the sub-shaft and the final drive shaft, the coupling 36 being particularly effective to carry the axial loads imposed on the connected shaft by permitting angular misalignments thereof.

Relative longitudinal movement between the splined fork members 37 of the rear couplings 36 and the splined shafts to which they are connected is prevented by the use of the bolt and nut arrangement 44 and 46, which exert a pressure on a washer 45 and thus lock the fork members 37 against longitudinal movement relative to the respective shaft ends.

The drive shaft construction, as described, comprises a resiliently mounted flexible drive in which end thrusts transmitted from the shaft 18 when it occupies the dotted line position indicated by the letter B in Fig. 1, are transmitted through the universal joints to the sub-shaft 15. In order to permit the entire shaft system to move relative to the vehicle frame I provide a resilient hanger construction embodying the present invention and support the rear end of the sub-shaft 15 adjacent its point of connection with the forward universal joint 36 by a connection with the vehicle cross-frame 50. The resiliently mounted hanger of the present invention comprises a bracket 51 which is secured to the cross-frame 50 preferably by a detachable connection such as the nuts and bolts 52. An eye 53 is formed integrally with the bracket 51 as is best shown in Fig. 3, and a supporting pin 54 is inserted in the eye 53 and extends outwardly from each end thereof. A pre-loaded resilient sleeve 55 surrounds the pin 54 and extends between it and the surface of the eye 53 and comprises with the pin 54 and the eye 53 a pre-loaded resilient bushing which permits torsional movement of the pin 54 relative to the eye 53. This movement is permitted entirely through movement in the resilient element of the resilient sleeve 55. This movement occurs solely inside of the body portion of the sleeve 55, whose torsional pre-loading is such that there is no relative movement between the surfaces of the pin 54 and the resilient sleeve 55, or between the inner surfaces of the eye 53 and the outer surfaces of the resilient sleeve 55.

Arms 56 and 57 are detachably secured to the ends of the pin 54 by means of split clamps or the like and each of the arms is provided with an eye 58, in each of which a pre-loaded resilient sleeve 59 is secured.

A stud 60 extends into each of the resilient sleeves 59. The resilient sleeve 59 and the eye 58 form a pre-loaded resilient bushing in which the studs 60 are resiliently supported for movement relative to the eyes 58. The studs 60 are secured to and form a support for a bearing supporting housing 61 carrying a ball bearing and race 62 which is sealed in the bearing chamber 63, by the cover 64. The shaft end 66 is rotatably journaled in the bearing 62 and the entire assembly may be packed with a suitable lubricant and the shaft thus be permitted to rotate freely relative to the hanger. A shaft oil sealing member 65 is preferably provided to prevent leakage of lubricant from the lubricant bearing chamber 63.

From the foregoing it will be seen that any longitudinal misalignment of the connected shafts will be permitted by reason of the universal joint construction and such thrusts as will be transmitted to the sub-shaft 15 are permitted to effect longitudinal movement of the entire assembly relative to the supporting frame 50 and this movement is accommodated by reason of the pivotal movement of the arms 56 and 57 relative to the stud 54 and the studs 60. Since the stud 54 and the studs 60 are both mounted in rubber, it will be seen that the movement of the studs is resiliently opposed by the rubber sleeves or bushings and that a direct metal to metal contact is avoided. The slight rotative movement which is required is permitted by twisting of the rubber member without any relative movement of the surfaces of the studs relative to the rubber surface or of the eye surface relative to the rubber surface. Bushings of this general type are known in the spring shackle art where they have been utilized to absorb high torsional strains.

Angular variation of the shaft 15 likewise is permitted because of the universal movement of the connected parts of the hanger. The bearing supporting member 61 is free to rotate about the studs 60 as a horizontal axis to the extent that such rotation is permitted by the rubber members 59. At the same time rotative movement of the arms 56 and 57 about the ends of the studs 54 will permit the angular movement of the member 61 in a horizontal plane in any desired vertical plane within the limits that such movement is to be permitted. It will be seen that the shaft end is supported at all times through the bearing carrier member 61 by the resilient sleeve members 55 and 59, and thus that there is no metal to metal contact between any of the parts of the said hanger construction.

The present construction, therefore, provides a resilient or floating suspension of the shafts which permits them to adjust themselves in operation at high speed so as to rotate around an axis passing through their respective centers of gravity rather than through their geometric axes. At all times the permitted movements of the shafts is resiliently opposed by the resilient bushings of the universal joints as well as by the resilient members of the present hanger construction.

I claim:

1. A resilient shaft hanger comprising a bracket secured to a supporting member, a pre-loaded rubber bushing carried by said bracket and engaging a stud having end portions extending outwardly from the ends of said bushing, a depending arm detachably secured to each end of said stud, a housing, a shaft journaling bearing carried in said housing, a pair of outwardly extending studs secured to said housing each of said studs being journalled in a pre-loaded rubber bushing carried in the depending end of each of said arms.

2. A resilient shaft hanger comprising a bracket secured to a supporting member, a pre-loaded rubber bushing carried by said bracket and having a central stud therein, the ends of which extend beyond the ends of said bushing, a pair of spaced swinging arms each one of which is detachably connected to one extending end of said stud to provide a resiliently opposed pivotal connection between said arms and said bracket, a housing, a bearing mounted in said housing, and adapted to provide a journaled bearing for the end of a shaft, a pair of oppositely disposed studs secured to said housing and resiliently journaled in pre-loaded rubber bushings carried by the depending ends of said swinging arms.

3. A resilient shaft hanger as claimed in claim 1 and further characterized in that the ends of said first named pre-loaded rubber bushing extend beyond the ends of said bracket and contact the depending arms to space them from the ends of said bracket.

4. A resilient shaft hanger as claimed in claim 3 and further characterized in that the ends of said second named pre-loaded rubber bushings extend outwardly from said arms toward said housing to space said housing from the depending ends of said arms.

FREDERICK M. GUY.

REFERENCES CITED

The following references are of record in the file of this patent:

UNITED STATES PATENTS

| Number | Name | Date |
| --- | --- | --- |
| 889,704 | Mair | June 2, 1908 |
| 1,388,389 | Tamura et al. | Aug. 23, 1921 |
| 1,445,125 | Battenburg | Feb. 13, 1923 |
| 1,808,365 | Masury | June 2, 1931 |
| 1,952,115 | Borst, Jr. | Mar. 27, 1934 |
| 2,043,725 | Anderson | June 9, 1936 |
| 2,102,415 | Herreshoff | Dec. 14, 1937 |
| 2,162,159 | Cole | June 13, 1939 |
| 2,195,647 | Guy | Apr. 2, 1940 |
| 2,238,737 | Hunter | Apr. 15, 1941 |

FOREIGN PATENTS

| Number | Country | Date |
| --- | --- | --- |
| 14,666 | Great Britain | July 10, 1908 |
| 24,549 | Great Britain | Oct. 29, 1913 |